July 11, 1961   J. E. WITZKY   2,991,768
PRE-COMBUSTION CHAMBER FOR INTERNAL COMBUSTION ENGINES
Filed April 2, 1953   2 Sheets-Sheet 1

FIG. I

INVENTOR
JULIUS E. WITZKY
BY George Sipkin
ATTORNEY

July 11, 1961  J. E. WITZKY  2,991,768
PRE-COMBUSTION CHAMBER FOR INTERNAL COMBUSTION ENGINES
Filed April 2, 1953  2 Sheets-Sheet 2

INVENTOR
JULIUS E. WITZKY
BY George Sipkin
ATTORNEY

United States Patent Office

2,991,768
Patented July 11, 1961

2,991,768
PRE-COMBUSTION CHAMBER FOR INTERNAL COMBUSTION ENGINES
Julius E. Witzky, Royal Oak, Mich., assignor, by mesne assignments, to the United States of America as represented by the Secretary of the Navy
Filed Apr. 2, 1953, Ser. No. 346,305
1 Claim. (Cl. 123—32)

This invention relates to internal combustion engines and more especially to pre-combustion and combustion chambers for such engines.

It is an object of this invention to provide novelly co-acting pre-combustion and combustion chambers in internal combustion engines which chambers reduce ignition knocks.

It is a further object of this invention to provide pre-combustion and combustion chambers which are so associated as to promote more complete combustion of the fuel.

Other objects and advantages of the invention will hereinafter become more fully apparent from the following description of the annexed drawings, which illustrate a preferred embodiment and wherein.

Figure 1:
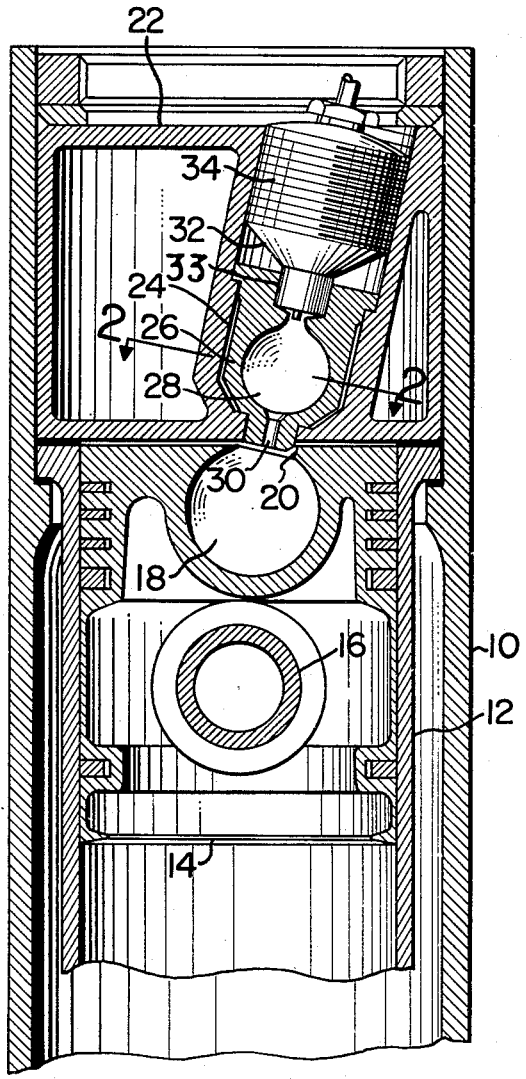
FIG. 1 is a sectional view of a portion of a diesel engine embodying the pre-combustion and combustion chambers of this invention, the piston being shown at its upper dead center position.
Figure 2:
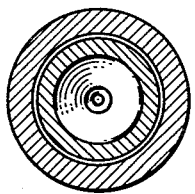
FIG. 2 is a sectional view on the line 2—2 of FIG. 1.

Referring now to the drawings, the reference numeral 10 designates a portion of the frame of an internal combustion engine of the diesel type. A cylinder 12 is secured in the frame and is spaced from the portion 10 to afford a flow of cooling water around the cylinder 12. A power piston 14 including a wrist pin 16 is located in the cylinder 12 and is adapted to reciprocate between an upper and a lower dead center position. The head of the piston 14 is formed to provide a spherical combustion chamber 18 in the upper surface of the piston 14. A cylindrical passage 20 affords communication between the piston combustion chamber 18 and the upper surface of the piston 14.

A cylinder head 22 is located above the cylinder 12 and is provided with a diagonal bore 24. A plug 26 is located in the bore 24 and is formed to provide a spherical pre-combustion chamber 28 which is smaller than the combustion chamber 18 located in the piston 14.

A cylindrical passage 30 in the lower portion of the plug 26 provides communication between the lowermost portion of the cylinder pre-combustion chamber 28 and the volume below the cylinder head 22. As shown in FIG. 1 the pre-combustion and combustion chambers 28 and 18 and the passages 20 and 30 are disposed coaxially when the piston is at its upper dead center position and, for purposes of the present illustrative example, such coaxial axis is shown at an angle of 12½ degrees with the axis of the cylinder 12.

A fuel injector 32 communicates through a bore 33 with the upper portion of the cylinder pre-combustion chamber 28. The fuel injector 32 may be secured in place by the threads 34 or by other means such as bolts (not shown). The operation of the pre-combustion and combustion chambers of this invention is as follows:

Assume that the diesel engine is operating under load and is at the proper working temperature, that the piston 14 is at its lower dead center, and that air has been sucked or has been forced into the cylinder 12. As the piston 14 moves to the upper dead center position of FIG. 1, the air in the cylinder 12 is compressed and forced substantially completely into the two chambers 18 and 28 and the two passages 20 and 30. At this point or slightly prior thereto, depending upon the timer setting of the engine, a fine stream of liquid fuel is forced by the injector 32 into the cylinder pre-combustion chamber 28 where it ignites spontaneously. This increases the pressure in the cylinder pre-combustion chamber 28 and forces some of the fuel-air mixture into the piston combustion chamber 18 where it continues burning. The fuel-air mixture in the cylinder pre-combustion chamber 28 is too rich for violent explosive combustion and that in the piston chamber 18 is too lean for such combustion so that knocking of the engine is obviated.

Figure 3:
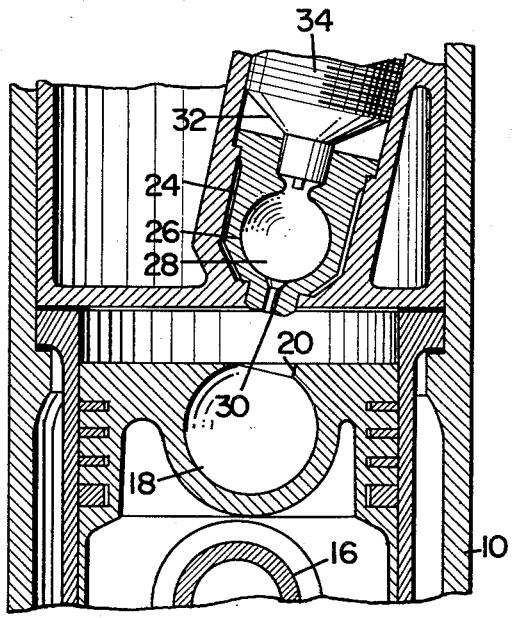
FIG. 3 is a view similar to FIG. 1 but with the piston slightly advanced in the downward power stroke.

As the piston 14 descends to the position illustrated in FIG. 3, the pressure in the piston combustion chamber 18 is relieved more quickly than the pressure in the cylinder chamber 28 because of the relatively larger passage 20 in the piston. Since the axes of the two chambers 18 and 28 and the passages 20 and 30 are inclined, the combustible mixture issuing from the cylinder pre-combustion chamber 28 will flow eccentrically into the piston combustion chamber 18, thereby causing the turbulence or swirling action of the gasses in the piston combustion chamber 18 which action aids in the further intermixing of the fuel and air thereby insuring a more complete combustion. The combustion of the fuel is completed in the cylinder 12.

The following is given as an example of the relative cross sectional area of the cavities involved in this invention. The cross sectional area of the cylinder passage 30 is taken as unity.

| Cavity: | Ratio |
|---|---|
| Cylinder passage 30 | 1 |
| Piston passage 20 | 14 |
| Cylinder pre-combustion chamber 28 | 34 |
| Piston combustion chamber 18 | 80 |
| Bore of cylinder 12 | 500 |

It will be apparent from the above that the pre-combustion and combustion chambers of this invention mitigate knocking of an internal combustion engine and promote a more complete combustion of the fuel therein.

Obviously many modifications and variations of the present invention are possible in the light of the above teachings. It is therefore understood that with the scope of the appended claim the invention may be practiced otherwise than as specifically described.

What is claimed is:

1. In an internal combustion engine having a cylinder; a piston adapted to reciprocate in the cylinder; a cylinder head enclosing one end of the cylinder; and a spherical pre-combustion chamber in the cylinder head; the improvements comprising nozzle means having a single restricted outlet passage for the pre-combustion chamber, said outlet passage having an axis, the axis of the outlet passage forming an acute angle with the longitudinal axis of the cylinder; a spherical primary combustion chamber in the piston; and a confined inlet passage for the primary combustion chamber, said inlet passage having an axis; a portion of the nozzle means projecting into and fitting within the inlet passage, and the axes of the outlet passage and of the inlet passage being substantially coincident when the piston is in its upper dead center position; the outer diameter of said portion of the nozzle means being only slightly less than the diameter of the inlet passage, whereby knocking by the engine is substantially obviated.

References Cited in the file of this patent

UNITED STATES PATENTS

| 2,171,912 | Boxan | Sept. 5, 1939 |
| 2,379,190 | Sanders | Jun. 26, 1945 |
| 2,622,570 | Nallinger | Dec. 23, 1952 |